(No Model.)
G. M. FLORER & C. W. MOYER.
COFFEE POT.
No. 412,739. Patented Oct. 15, 1889.
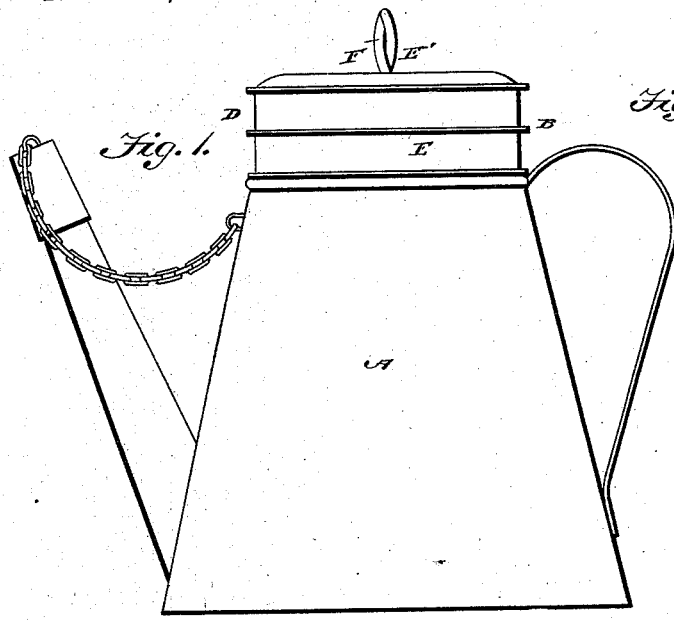
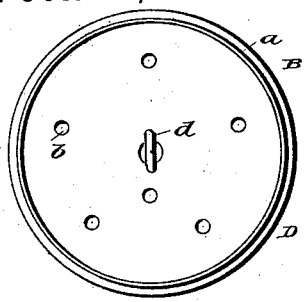
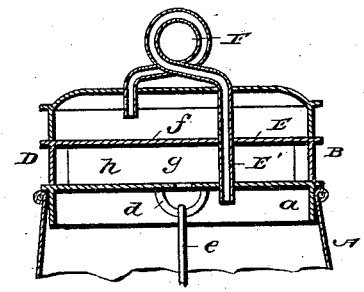
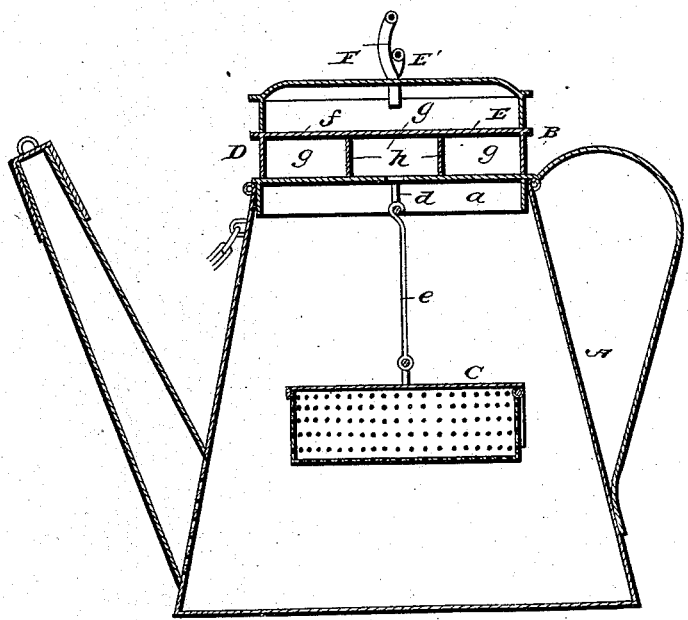
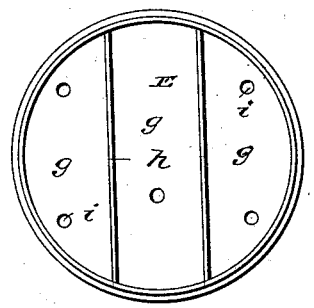

UNITED STATES PATENT OFFICE.

GEORGE M. FLORER AND CHARLES W. MOYER, OF BELOIT, KANSAS.

COFFEE-POT.

SPECIFICATION forming part of Letters Patent No. 412,739, dated October 15, 1889.

Application filed July 10, 1889. Serial No. 317,010. (No model.)

*To all whom it may concern:*

Be it known that we, GEORGE M. FLORER and CHARLES W. MOYER, citizens of the United States, residing at Beloit, in the county of Mitchell and State of Kansas, have invented certain new and useful Improvements in Coffee-Pots; and we do declare the following to be a full, clear, and exact description of the invention, such as will enable others skilled in the art to which it appertains to make and use the same.

This invention has relation to improvements in coffee-pots; and it has for its object the provision of means whereby the steam rising within the pot may be carried above the same through a condensing-pipe and deposited in a condensing-chamber, from which the water of condensation in the form of drip-coffee may be returned to the vessel or pot. This object we accomplish by the devices shown and illustrated in the accompanying drawings, in which—

Figure 1 is a side view of a coffee-pot carrying our improvements. Fig. 2 is a longitudinal central sectional view. Fig. 3 is a sectional view through the condensing-chamber and tube, showing the chamber upon a portion of a coffee-pot. Fig. 4 is an inverted plan view of the cover, and Fig. 5 is an inverted plan view of the condensing-chamber removed from the cover.

Referring by letter to the said drawings, A indicates a coffee-pot, which may be of an ordinary or approved construction, having a suitable spout and handle.

B indicates the cover, which is hinged to the pot in the ordinary manner, and has the usual marginal flange $a$ to enter the pot when the cover has been closed. The top of this cover B is provided with a plurality of apertures $b$, which are designed to establish a communication between the interior of the coffee-pot and the several compartments in the lower section of the condensing-chamber. This cover is also provided with a central depending loop $d$, which is designed to receive the stem $e$ of the percolating-holder C, suspended within the pot. This holder C for the coffee may be of any suitable construction, the one here shown having a perforated body and bottom with a hinged top.

D indicates the condensing-chamber. This chamber is formed into an upper and a lower compartment by a horizontal partition $f$. The lower compartment is divided into a number of smaller compartments $g$ by means of vertical partitions $h$, and the whole device is firmly secured above the cover B. The horizontal wall E is provided with perforations $i$, so as to form a communication or passages from the upper chamber of the condenser to the lower chamber, and from thence through the cover into the pot. It will be observed that the central compartment $g$ is shut off from communication with the upper chamber, so that the water of condensation as it passes from the upper chamber is passed through the outer chamber or compartments $g$ into the coffee-pot.

E' indicates a pipe, which has one end leading from the inside of the cover and the coffee-pot through the condensing-chamber, where it is formed into a loop or eye F, and thence carried into the upper compartment of the condensing-chamber. It will thus be seen that this pipe is exposed above the coffee-pot and its condensing-chamber, and may serve at this point the additional function of a handle or means of manipulating the cover and condensing-chamber thereon. The pipe, being exposed, will serve more efficiently as a condenser for the steam passing through it.

In operation, when coffee has been placed in the percolator and the water in the pot begins to boil, the steam, rising, will enter the pipe E', and, being carried through the same and the loop or eye therein, will discharge through said pipe into the upper chamber of the condenser. The condensation taking place at this point, the water dripping into the upper chamber of the condenser will pass through the apertures $i$ therein into the two outer lower chambers of the lower compartment, and from thence through the aperture in the cover into the pot, when an excellent quantity of drip-coffee may be had, and in a very short time.

It is obvious that the condensing-chamber may be made fast to the cover; or it may be made separately and secured to the cover in any suitable manner.

Having described our invention, what we claim is—

1. The combination, with a coffee-pot, of a cover having a plurality of apertures in its top, a condensing-chamber arranged above the cover and divided into an upper and lower compartment, and a pipe leading through the cover from the interior of the coffee-pot and through the condensing-chamber above the same, and having its opposite end opening into the upper compartment of the condensing-chamber, substantially as specified.

2. The combination, with a coffee-pot, of a cover having perforations in its top, a condensing-chamber arranged above the cover, and a steam-pipe passing from the interior of the cover in a loop form above the condensing-chamber, and having its opposite end entering the upper compartment of said chamber, whereby said pipe may serve the additional function of a handle, substantially as specified.

3. The condensing-chamber divided into an upper and lower compartment by a horizontal partition, and the lower compartment divided by vertical partitions, so as to form a central and two lateral chambers, the lateral chambers having their top walls perforated to communicate with the upper chamber, and a steam-pipe passing through the central lower compartment above the condenser in a loop form, and having its opposite end passing into the upper chamber of a condenser, the whole adapted to serve upon a coffee-pot, substantially as specified.

4. The combination, with a coffee-pot, of a cover having perforations in its top, a percolator suspended from the cover, and a condensing-chamber arranged above the cover and divided into compartments, and a steam-pipe having one end communicating with the interior of a coffee-pot and its opposite end entering the upper chamber of the compartment, substantially as specified.

In testimony whereof we affix our signatures in presence of two witnesses.

GEO. M. FLORER.
CHAS. W. MOYER.

Witnesses:
IRA M. WILLEY,
J. A. SCHELLINGER.